United States Patent
Bendell

(10) Patent No.: US 9,819,721 B2
(45) Date of Patent: Nov. 14, 2017

(54) DYNAMICALLY POPULATED MANIFESTS AND MANIFEST-BASED PREFETCHING

(71) Applicant: Akamai Technologies, Inc., Cambridge, MA (US)

(72) Inventor: Colin Bendell, Ottawa (CA)

(73) Assignee: AKAMAI TECHNOLOGIES, INC., Cambridge, MA (US)

( * ) Notice: Subject to any disclaimer, the term of this patent is extended or adjusted under 35 U.S.C. 154(b) by 78 days.

(21) Appl. No.: 14/528,238

(22) Filed: Oct. 30, 2014

(65) Prior Publication Data
US 2015/0120821 A1 Apr. 30, 2015

Related U.S. Application Data

(60) Provisional application No. 61/898,381, filed on Oct. 31, 2013.

(51) Int. Cl.
| | |
|---|---|
| *G06F 15/16* | (2006.01) |
| *H04L 29/08* | (2006.01) |
| *G06F 17/30* | (2006.01) |

(52) U.S. Cl.
CPC ........ *H04L 67/02* (2013.01); *G06F 17/30899* (2013.01); *G06F 17/30902* (2013.01); *H04L 67/2842* (2013.01)

(58) Field of Classification Search
CPC .............. G06F 17/30899; G06F 17/30902
USPC ....................................................... 709/203
See application file for complete search history.

(56) References Cited

U.S. PATENT DOCUMENTS

| | | |
|---|---|---|
| 5,802,292 A | 9/1998 | Mogul |
| 6,023,726 A | 2/2000 | Saksena |
| 6,055,572 A | 4/2000 | Saksena |
| 6,085,193 A | 7/2000 | Malkin et al. |
| 6,085,226 A | 7/2000 | Horvitz et al. |
| 6,108,703 A | 8/2000 | Leighton et al. |

(Continued)

FOREIGN PATENT DOCUMENTS

EP      1398715 A2    3/2004

OTHER PUBLICATIONS

W3C, Resource Hints, First Public Working Draft Oct. 21, 2014, Ilya Grigorik, ed., 10 pages.

(Continued)

*Primary Examiner* — Kevin Mai

(57) ABSTRACT

Described herein are, among other things, systems and methods for generating and using manifests in delivering web content, and for using such manifests for prefetching. Manual and automated generation of manifests are disclosed. Such manifests preferably have placeholders or variables that can be populated at the time of the client request, based on data known from the request and other contextual information. Preferably though without limitation an intermediary device such as a proxy server, which may be part of content delivery network (CDN), performs the function of populating the manifest given a client request for a page. An intermediary or other computer device with a populated manifest can utilize that completed manifest to make anticipatory forward requests to an origin to obtain web resources specified on the manifest, before receiving the client's requests for them. In this way, many kinds of content may be prefetched based on the manifest.

16 Claims, 9 Drawing Sheets

(56) References Cited

U.S. PATENT DOCUMENTS

| | | | |
|---|---|---|---|
| 6,393,526 | B1 | 5/2002 | Crow |
| 6,820,133 | B1 | 11/2004 | Grove et al. |
| 7,111,057 | B1 | 9/2006 | Sherman et al. |
| 7,240,100 | B1 | 7/2007 | Wein et al. |
| 7,274,658 | B2 | 9/2007 | Bornstein et al. |
| 7,296,082 | B2 | 11/2007 | Leighton et al. |
| 7,376,716 | B2 | 5/2008 | Dilley et al. |
| 7,472,178 | B2 | 12/2008 | Lisiecki et al. |
| 7,596,619 | B2 | 9/2009 | Leighton et al. |
| 7,600,025 | B2 | 10/2009 | Lewin et al. |
| 7,660,296 | B2 | 2/2010 | Fletcher et al. |
| 8,112,471 | B2 | 2/2012 | Wei et al. |
| 8,447,837 | B2 | 5/2013 | Devanneaux et al. |
| 8,607,221 | B1* | 12/2013 | Donahue .................. G06F 8/65 717/173 |
| 8,645,494 | B1 | 2/2014 | Birnbaum et al. |
| 8,856,263 | B2 | 10/2014 | Fainberg et al. |
| 9,037,638 | B1 | 5/2015 | Lepeska et al. |
| 9,106,607 | B1* | 8/2015 | Lepeska .............. H04L 67/2847 |
| 2002/0103778 | A1 | 8/2002 | Saxena |
| 2004/0258053 | A1 | 12/2004 | Toporek |
| 2005/0138143 | A1 | 6/2005 | Thompson et al. |
| 2006/0069617 | A1 | 3/2006 | Milener et al. |
| 2007/0156845 | A1 | 7/2007 | Devanneaux et al. |
| 2007/0216674 | A1 | 9/2007 | Subramanian et al. |
| 2011/0173345 | A1 | 7/2011 | Knox et al. |
| 2011/0314091 | A1 | 12/2011 | Podjarny |
| 2012/0136928 | A1 | 5/2012 | Dillon |
| 2012/0246257 | A1 | 9/2012 | Brown |
| 2012/0265853 | A1 | 10/2012 | Knox et al. |
| 2012/0311020 | A1 | 12/2012 | Brown |
| 2014/0006484 | A1 | 1/2014 | Devanneaux et al. |
| 2014/0129666 | A1* | 5/2014 | Cox .................. G06F 17/30902 709/213 |
| 2014/0359491 | A1 | 12/2014 | Teeraparpwong et al. |
| 2014/0379840 | A1 | 12/2014 | Dao |
| 2015/0089352 | A1 | 3/2015 | Conboy et al. |
| 2015/0120821 | A1 | 4/2015 | Bendell |

OTHER PUBLICATIONS

W3C, 'HTML5—A vocabulary and associated APIs for HTML and XHTML', W3C Candidate Recommendation Dec. 17, 2012, Section 5 "Loading Web pages", 79 pages, available at http://www.w3.org/TR/2012/CR-html5-20121217/browsers.html#offline.

U.S. Appl. No. 14/311,699.

Press Release, Akamai Redefines Web Performance with Aqua Ion, Oct. 9, 2012, 3 pages.

Arun Venkataramani, The potential costs and benefits of long-term prefetching for content distribution, Computer communications 25 (2002), Elsevier, 367-375.

Padmanabhan et al., Using Predictive Prefetching to Improve World Wide Web Latency, ACM SIGCOMM Computer Communication Review, vol. 26 Issue 3, Jul. 1996, pp. 22-36.

Venketesh, et al., Graph Based Prediction Model to Improve Web Prefetching, International Journal of Computer Applications (0975-8887), vol. 36—No. 10, pp. 37-43, Dec. 2011.

U.S. Appl. No. 13/897,467, filed May 20, 2013.

Venkataramani et al., The potential costs and benefits of long-term pre-fetching for content distribution, Computer Communications 25 (2002), pp. 267-375.

U.S. Appl. No. 14/494,682.

David Walsh, HTML5 LInk Prefetching, Jul. 7 2010 at https://davidwalsh.name/html5prefetch, 12 pages (downloaded Dec. 15, 2015).

Revision 307873 of Link prefetching FAQ, Sep. 17, 2012, at https://developer.mozilla.org/enUS/docs/Web/HTTP/Link_prefetching_FAQ$revision/307873, 5 pages (downloaded Dec. 15, 2015).

HTML Living Standard—Last Updated Oct. 11, 2013, HTML5, Wayback machine archive located at https://web.archive.org/web/20131013212708/http://www.whatwg.org/specs/webapps/currentwork/, 445 pages, (downloaded Dec. 15, 2015).

Nicholas Armstrong, Just-in-Time Push Prefetching: Accelerating the Mobile Web, master's thesis presented to Univ. of Waterloo, Waterloo, Ontario, Canada, dated 2011.

Andrey Uzunov, Speeding Up Tor with SPDY, master's thesis presented to the Univ. of Munich, dated Nov. 15, 2013.

Randy Appleton et al., Evaluating Several Different Web Prediction Algorithms, Northern Michigan Univ., presented at 29th Int'l Conf on Computers and Their Applications (CATA-2014), Mar. 24-26, 2014, Las Vegas, NV.

S. Schecter, M. Krishnan, and M. Smith, Using path profiles to predict HTTP requests, Computer Networks and ISDN Systems 30 (1998), pp. 457-467.

Fisher, Darin et al., "Link Prefetching in Mozilla: A Server-Driven Approach, (2003),", downloaded May 9, 2016 from http://citeseerx.ist.psu.edu/viewdoc/download?doi=10.1.1.2.8135&rep=rep1&type=pdf, 6 pages.

Srivastava, Jaideep et al., "Web Usage Mining: Discovery and Applications of Usage Patterns from Web Data,", SIGKDD Explorations Copyright 1999, ACM SIGKDD, Jan. 2000, vol. 1, Issue 2, 12 pages.

Wu, K.L. et al., "SpeedTracer: A Web usage mining and analysis tool, IBM Systems Journal, vol. 37, No. 1, 1998, 17 pages.", IBM Systems Journal, vol. 37, No. 1, 1998, 17 pages.

* cited by examiner

DYNAMICALLY POPULATED MANIFESTS AND MANIFEST-BASED PREFETCHING

REFERENCE TO RELATED APPLICATIONS

This application is based on and claims the benefit of priority of U.S. Application No. 61/898,381, filed Oct. 31, 2013 and titled "Prefetching With Dynamically Configured HTML5 Manifests," the teachings of which are hereby incorporated by reference in their entirety.

This patent document contains material which is subject to copyright protection. The copyright owner has no objection to the facsimile reproduction by anyone of the patent document or the patent disclosure, as it appears in Patent and Trademark Office patent files or records, but otherwise reserves all copyright rights whatsoever.

BACKGROUND

Technical Field

This patent document relates generally to distributed data processing systems, to the delivery of content over computer networks, and to systems and methods for accelerating such delivery using prefetching techniques.

Brief Description of the Related Art

It is known in the art to use an intermediary device, such as a forward or reverse proxy server, to facilitate the delivery of content from servers to requesting client devices. It is also known for intermediary and other servers to prefetch content in anticipation of a client's request, so as to improve the speed with which the intermediary can respond to the request.

One example, not meant to be limiting, of a content delivery platform that can use prefetching is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery and/or the support of outsourced site infrastructure. This infrastructure is shared by multiple tenants, typically the content providers. The infrastructure is generally used for the storage, caching, or transmission of content on behalf of such content providers or other tenants.

In a known system such as that shown in FIG. 1, a distributed computer system 100 is configured as a content delivery network (CDN) and has a set of servers 102 distributed around the Internet. Preferably, many of the servers are located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the CDN servers (also referred to as the content servers). Such content servers may be grouped together into a point of presence (POP) 107 at a particular geographic location.

As noted, the CDN servers are typically located at nodes that are publicly-routable on the Internet, within or adjacent nodes that are located in mobile networks, in or adjacent enterprise-based private networks, or in any combination thereof.

Typically, content providers offload their content delivery by aliasing (e.g., by a DNS CNAME) given content provider domains or sub-domains to domains that are managed by the service provider's authoritative domain name service. The server provider's domain name service directs end user client machines 122 that desire content to the distributed computer system (or more particularly, to one of the CDN servers) to obtain the content. A given CDN server typically operates as a proxy server, responding to the client requests, for example, by fetching requested content from a local cache, from another CDN server, from the origin server 106 associated with the content provider, or other source, and sending it to the requesting client.

For cacheable content, CDN servers typically employ on a caching model that relies on setting a time-to-live (TTL) for each cacheable object. After it is fetched, the object may be stored locally at a given CDN server until the TTL expires, at which time is typically re-validated or refreshed from the origin server 106. For non-cacheable objects (sometimes referred to as 'dynamic' content), the CDN server typically returns to the origin server 106 time when the object is requested by a client. The CDN may operate a cache hierarchy to provide intermediate caching of customer content in various CDN servers closer to the CDN server handling a client request than the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other functions. Distributed network agents 118 monitor the network as well as the server loads and provide network, traffic and load data to a DNS query handling mechanism 115. A distributed data transport mechanism 120 may be used to distribute control information (e.g., metadata to manage content, to facilitate load balancing, and the like) to the CDN servers. The CDN may include a network storage subsystem which may be located in a network datacenter accessible to the CDN servers and which may act as a source of content, such as described in U.S. Pat. No. 7,472,178, the disclosure of which is incorporated herein by reference.

As illustrated in FIG. 2, a given machine 200 in the CDN comprises commodity hardware (e.g., a microprocessor) 202 running an operating system kernel (such as Linux® or variant) 204 that supports one or more applications 206. To facilitate content delivery services, for example, given machines typically run a set of applications, such as an HTTP proxy 207, a name service 208, a local monitoring process 210, a distributed data collection process 212, and the like. The HTTP proxy 207 typically includes a manager process for managing a cache and delivery of content from the machine. For streaming media, the machine may include one or more media servers.

A given CDN server shown in FIG. 1 may be configured to provide one or more extended content delivery features, preferably on a domain-specific, content-provider-specific basis, preferably using configuration files that are distributed to the CDN servers using a configuration system. A given configuration file is preferably XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer. U.S. Pat. No. 7,111,057, incorporated herein by reference, describes an architecture for purging content from the CDN. More information about a CDN platform can be found in U.S. Pat. Nos. 6,108,703 and 7,596,619, and as pertains to delivery of streaming media, U.S. Pat. No. 7,296,082, and U.S. Publication Nos. 2011/0173345 and 2012/0265853, the teachings of all of which are hereby incorporated by reference in their entirety.

In a typical operation, a content provider identifies a content provider domain or sub-domain that it desires to have served by the CDN. When a DNS query to the content provider domain or sub-domain is received at the content provider's domain name servers, those servers respond by returning the CDN hostname (e.g., via a canonical name, or CNAME, or other aliasing technique). That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. As aforementioned, these content handling rules and directives may be located within an XML-based "metadata" configuration file.

The CDN platform may be considered an overlay across the Internet which improves communication efficiency. As such, the CDN platform may be used to facilitate wide area network (WAN) acceleration services between enterprise data centers and/or between branch-headquarter offices (which may be privately managed), as well as to/from third party software-as-a-service (SaaS) providers or other cloud providers used by the enterprise users.

To accomplish these use cases, CDN software may execute on machines (potentially in virtual machines running on customer hardware) hosted in one or more customer data centers, and on machines hosted in remote "branch offices." This type of solution provides an enterprise with the opportunity to take advantage of CDN technologies with respect to their company's intranet, providing a wide-area-network optimization solution. It extends acceleration for the enterprise to applications served anywhere on the Internet. By bridging an enterprise's CDN-based private overlay network with the existing CDN public internet overlay network, an end user at a remote branch office obtains an accelerated application end-to-end. FIG. 3 illustrates a general architecture for a WAN optimized, "behind-the-firewall" service offering such as that described above. Other information about a behind the firewall service offering can be found in teachings of U.S. Pat. No. 7,600,025, the teachings of which are hereby incorporated by reference.

As mentioned above, a CDN server can be programmed to prefetch content. For example, when a CDN server receives a request for the HTML (hypertext markup language) for a web page, the CDN server can fetch and deliver the HTML document to the client, and also parse the HTML to discover the embedded resources on that particular page. The CDN server can retrieve those embedded resources before receiving a request for them from the client. Prefetching in a CDN and site acceleration with content prefetching enabled through customer-specific configurations are described in U.S. Pat. No. 8,447,837, the teachings of which are hereby incorporated by reference.

Further it is known in the prior art for a server in a CDN platform to prefetch objects, including further HTML documents, as it delivers an initial HTML document. This technique is based on "hints" or instructions given by an origin server in the HTML that it sends to a CDN server. For example, a content provider may designate certain universal resource locators (URLs) in the HTML as prefetching candidates by inserting into certain tags (typically an <a/> tag or <link/> tag) an attribute to indicate it should be prefetched. An example is to set the HTML 'rel' attribute to 'prefetch', which is supported by HTML specifications. Upon seeing these tags in the HTML returned from an origin server, the CDN servers prefetch the designated objects. This approach may be used for both cacheable and non-cacheable content. In this case, the origin server operator (the customer of the CDN) typically looks at analytics to decide what the next logical page is that an end-user might request, and updates their HTML with the tags to effect the feature. The foregoing prior art represents work of others.

Note that prefetching applies not only in CDNs and not only in intermediary devices (whether in a CDN or not), but elsewhere as well. Generally speaking, a server communicating with a requesting client may prefetch content from local disk to memory, from memory to a CPU memory cache, and/or from a remote storage device to local buffer, and the like.

Prefetching techniques can make a significant difference in the speed with which content is delivered to a client. However, determining what should be prefetched is not necessarily straightforward. This is particular true with the complexity of modern websites and web pages, which are typically composed not only of embedded static content, but also rely on the client's execution of scripts and logic for generating, manipulating, and updating page elements, including that commonly referred to as AJAX. Improved prefetching techniques are therefore desirable. Further, applying prefetching techniques to a wide scope of content with minimal administrative cost and setup effort is desirable.

The teachings herein address these needs. They also provide other benefits and improvements to computer operation and content delivery that will become apparent in view of this disclosure.

SUMMARY

Described herein are, among other things, systems and methods for generating and using manifests in delivering web content, and for using such manifests for prefetching. Manual and automated generation of generic or template manifests are disclosed. Such manifests may be HTML5 compliant, and preferably have placeholders or variables that can filled in at the time of the client request, based on data in the client request, such as cookie values, request URL parameters, HTTP header field values, and the like. This placeholder/variable approach allows the generic manifest to be used for multiple different pages within a given website. Preferably, an intermediary device such as a proxy server, which may be part of content delivery network (CDN), performs the function of populating the manifest given a client request for a page. However, this is not a limitation and the techniques described herein may be applied in web servers and other computer apparatus.

An intermediary or other computer device with a populated manifest can utilize that completed manifest to make anticipatory forward requests to an origin to obtain resources specified on the manifest, prior to receiving the client's requests for them. Many kinds of content may be prefetched, including content that the client might request based on the firing of AJAX scripts on the page (and which therefore, e.g., may not be readily identifiable as embedded resources to an intermediary prefetch parser). Further, content on pages that are linked to the requested page—even multiple clicks away in site navigation—may be prefetched if specified on the manifest.

In one embodiment, a method according to the invention is implemented with a computer apparatus that has at least one microprocessor and memory holding computer program instructions for execution by the at least one microprocessor. The method involves the computer apparatus receiving a request from a client device for an HTML document; retrieving the HTML document from any of: (i) a remote server and (ii) a local cache; retrieving a manifest from any of: (i) the remote server and (ii) the local cache, wherein the manifest specifies a set of one or more resources (e.g., using URLs or otherwise); and rewriting one more strings in the manifest based on data in the client device's request (such as a value of a request header field, a URL parameter, and a value in a cookie). The method further includes, after rewriting the one or more strings, sending the manifest to the client device. In some embodiments, the method may further include the computer apparatus requesting a particular resource on the manifest from any of: (i) the remote server and (ii) the local cache, prior to receiving a request from the client device for the particular resource. The aforementioned particular resource may be the target of a script in the HTML document having instructions executable by the client device to generate a request for the particular resource. The particular prefetched resource may be embedded in an HTML document other than HTML document that the client device requested (e.g., in a HTML document that is a few user actions away in site navigation). The foregoing may also be realized in systems and computer apparatus.

In another embodiment, a method according to the invention is implemented with a computer apparatus that has at least one microprocessor and memory holding computer program instructions for execution by the at least one microprocessor. The instructions cause the computer to perform a method that involves receiving a request from a client device for an HTML document; retrieving the HTML document from any of: (i) a remote server and (ii) a local cache; retrieving a manifest such as an HTML5 manifest from any of: (i) the remote server and (ii) the local cache, wherein the manifest specifies a set of one or more resources; and requesting a particular resource on the manifest from any of: (i) the remote server and (ii) the local cache, prior to receiving a request from the client device for the particular resource. The aforementioned particular resource may be the target of a request generated by a script included in the HTML document, the script having instructions executable by the client device to generate the request (e.g., an asynchronous request) for the particular resource. The particular resource may be embedded in a HTML document other than the HTML document that the client device requested, such as a page that occurs later in site navigation. The foregoing may also be realized in systems and computer apparatus.

The subject matter described herein has a variety of applications in content delivery and online platform architectures. As those skilled in the art will recognize, the foregoing description merely refers to certain examples of the invention for purposes of overview. It is not limiting and the teachings hereof may be realized in a variety of systems, apparatus and methods of electronic content delivery. It should also be noted that the allocation of functions to particular machines described herein is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

Figure 1:
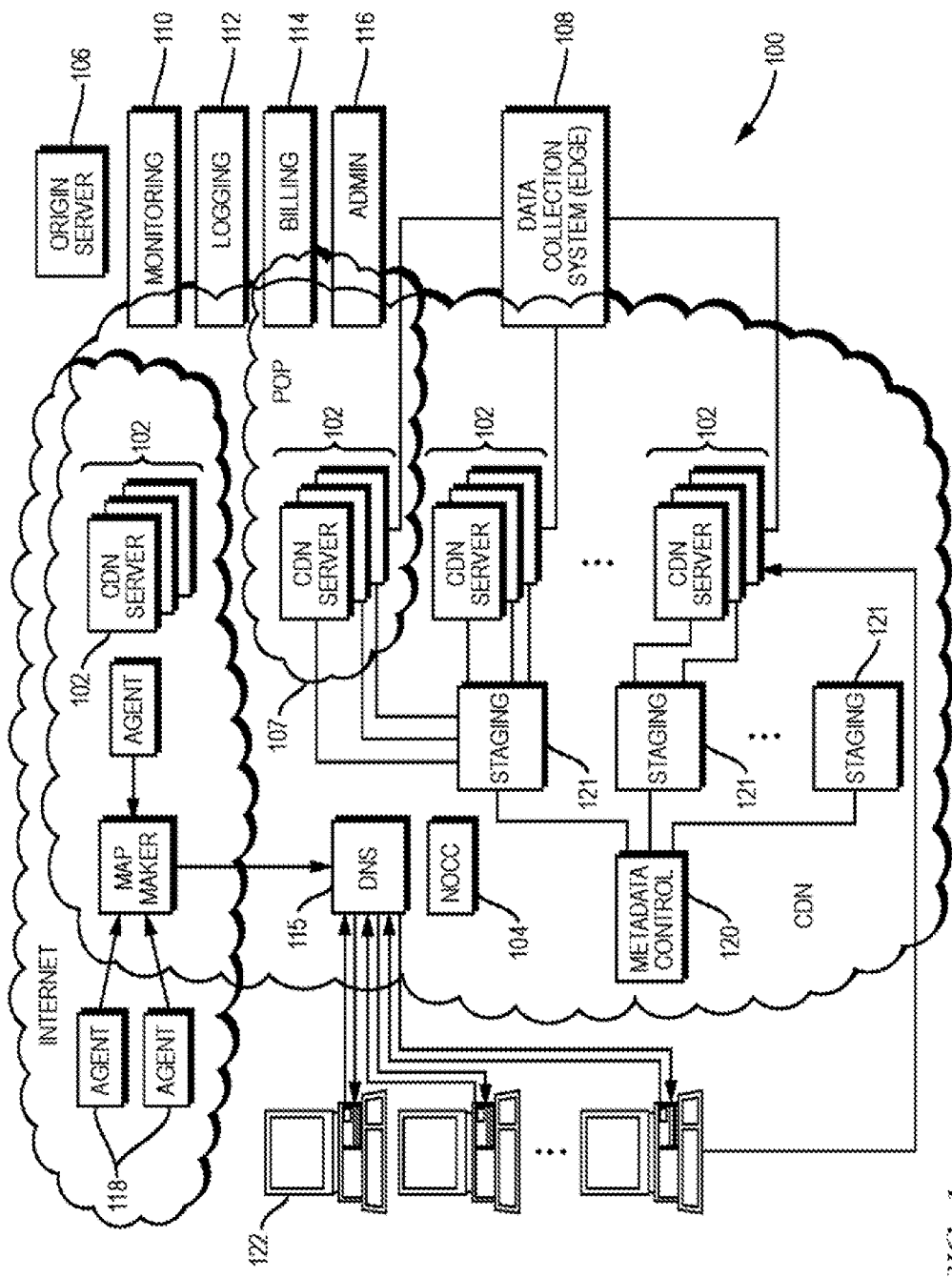
FIG. 1 is a schematic diagram illustrating an embodiment of a known distributed computer system configured as a content delivery network (CDN), in which the teachings of the invention may be implemented.

The following description sets forth embodiments of the invention to provide an overall understanding of the principles of the structure, function, manufacture, and use of the methods and systems and apparatus disclosed herein. The systems, methods and apparatus described herein and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety. Throughout this disclosure, the term "e.g." is used as an abbreviation for the non-limiting phrase "for example." The order of steps presented in any sequence of operation described herein is not meant to be limiting, particularly with respect to the sequence and/or priority of tasks occurring within a given machine.

The term 'prefetching' is used herein to refer to requesting content from a source that is not in response to receiving a request from a client for that content, typically prior to such a client request and based on some determination that the client will request the content (or that it is likely to request the content, with some level of confidence). The determination may be based on a variety of factors, e.g., based on prior requests, or knowledge of the client, or other factors. As a result of the prefetch, the device or module that prefetches the content can have the content ready to be delivered to the client more quickly when the expected request arrives.

The prefetched content may be web page objects and components, such as CSS, image files, videos, scripts, text, other data files, embedded HTML documents, or the like, for rendering a web page whose presentation is described by an HTML document. The prefetched content may also represent data such as JSON objects, unstructured or structured data that is needed as a result of client-side script execution on the page using AJAX or similar technologies. The term 'resource' is used herein to refer inclusively to such page objects, components, and/or AJAX requested data and any other prefetch-capable data, including data for use in rendering, displaying, updating, or manipulating a page presentation.

In some cases an intermediary device may prefetch content and cache it to be ready for all clients, cache it for a set of clients, or retrieve it only for a specific client. In the latter case, the prefetched resource does not need to be cached for reuse. Instead, an algorithm associates the initiating client to the prefetch request and ensures only the initiating client will consume the resource. To identify the user and associate them uniquely with the prefetched resource, the algorithm can use such artifacts as the TCP connection, HTTP Cookies that identify user session or other network and connection artifacts.

While useful with HTML, the techniques outlined herein can be adapted for markup languages (e.g., XML, WML, SGML) and their respective presentation contexts.

The novel methods and systems described herein are preferably performed by an intermediary device such as a proxy server (e.g., a CDN proxy), although they are not necessarily limited to such an embodiment and could also be performed in a variety of other contexts—by an intermediating plugin/module or a plugin/module logically in front of a web server, for example, or one running in a client device.

Figure 2:
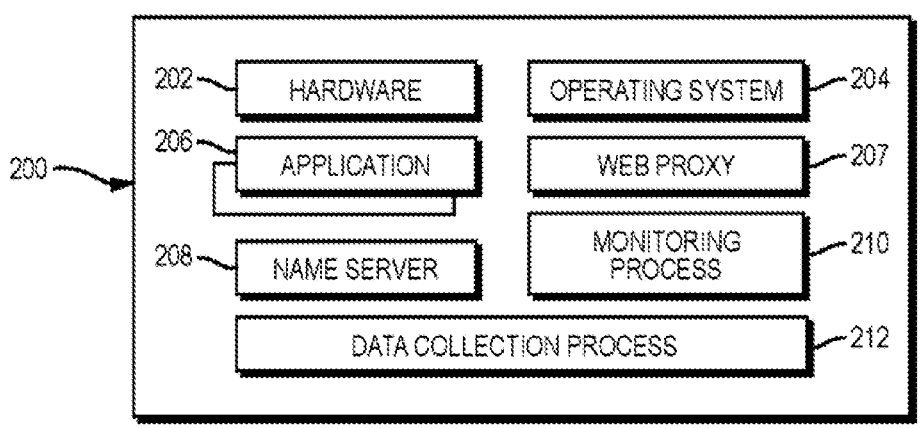
FIG. 2 is a schematic diagram illustrating an embodiment of a machine on which a CDN server in the system of FIG. 1 can be implemented.
Figure 3:
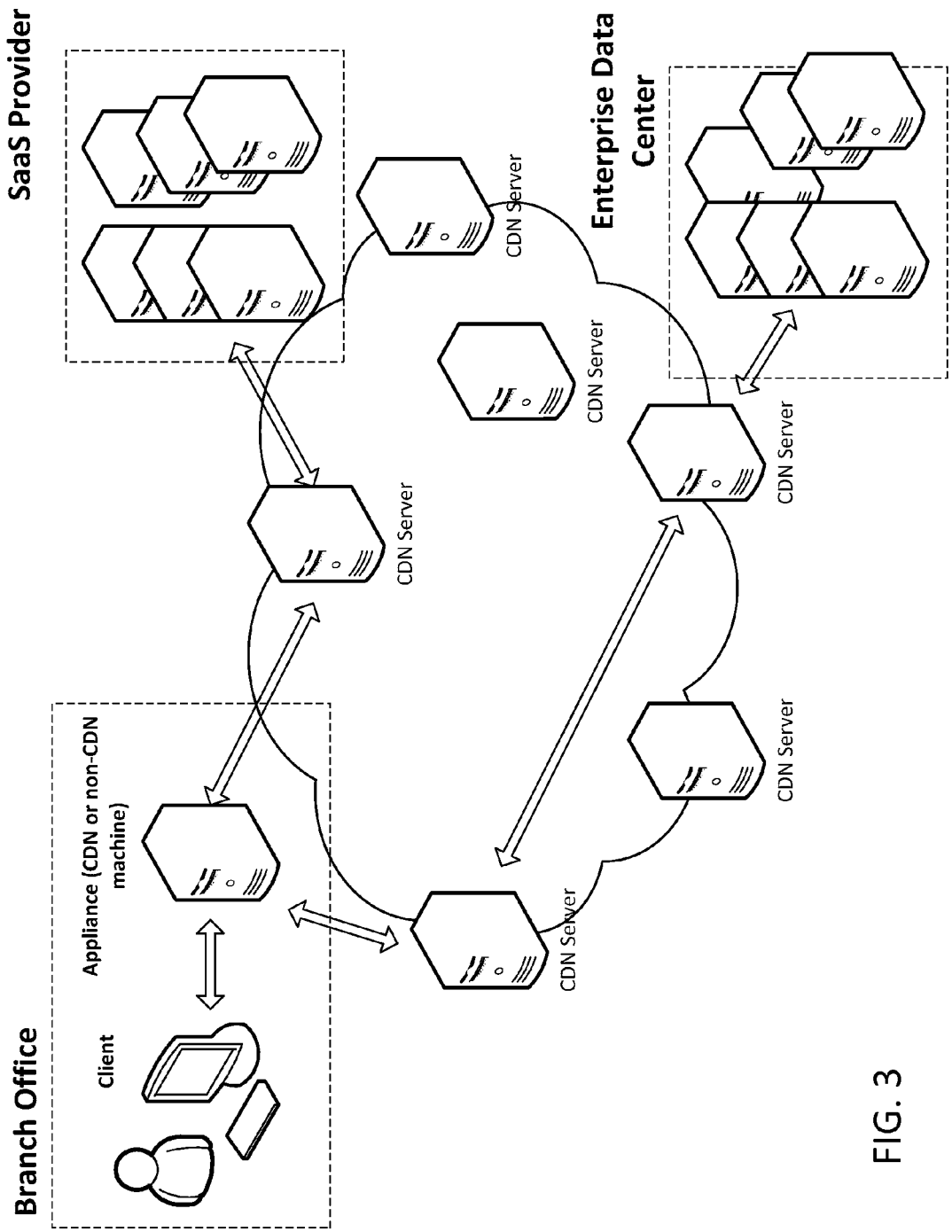
FIG. 3 is a schematic diagram illustrating an embodiment of an overlay infrastructure that accelerates delivery of content among and between an enterprise branch office, a cloud services provider, and an enterprise data center.

According to this disclosure, a proxy server or other intermediary can be modified to generate and/or populate a generic (template) manifest file corresponding to a given content provider web page, based on elements of a client request message. The proxy or other intermediary can then use that manifest for prefetching. Preferably the proxy server is a CDN proxy server in a CDN platform, as described above with respect to FIGS. 1-2, although this is not a limitation of the teachings hereof. In a preferred embodiment, the manifest file is an HTML5 manifest.

HTML5 Manifests

HTML5 is a known technology that provides a mechanism for a server to inform a browser or other client application about resources in an associated web page that should be cached locally at the client, so as to enable offline browsing capabilities. A markup language document, e.g., in HTML, references the manifest, typically by referencing the manifest's universal resource locator (URL) in an attribute of the page's HTML tag. A compliant client can then request the manifest and parse the file. The manifest can specify resources (e.g., by URL) that are to be cached locally using a 'CACHE' moniker. Additionally, the manifest can specify other resources for the page that should not be available offline (in other words, that must be obtained from the server) using a 'NETWORK' moniker. In either case, the specified resources may include things such as images, scripts, and HTML documents.

Generic Manifests

A barrier to using HTML5 manifests is that a manifest file must be created for each page. This is often done manually, making it a time-consuming and labor-intensive process, and leading to low adoption.

According to this disclosure, a generic manifest can be created that will apply to a class of pages at a given website that share common resources. For example, a "product page" manifest may be created for use with all product pages or a subset thereof, as these pages may share a common layout. The generic manifest contains URLs for page resources, but also contains placeholders (variables) within certain URLs that are meant to be populated by the intermediary proxy server based on the proxy server's knowledge of a client request (e.g., the particular request URL parameters, HTTP request header field values, and/or cookie values in the client request). The proxy replaces the strings denoted by the variables in the manifest with data based on the client request. The result is a populated manifest to the page that can be returned to the client.

The generic manifest can be created manually for a given set of pages that leverage similar sets of resources. The generic manifest alternatively can be generated based on an automated analysis of an HTML document (e.g., via a simulated execution/rendering thereof using a known browser rendering engine) and/or can be generated via analysis of past log files which represent past request patterns. Automated generation of manifests is described in more detail later.

An example of a generic manifest is provided below (the template below is illustrative only and not limiting):

```
# DEFINE Product_ID=1234
# DEFINE Language=en-us
# DEFINE Language=#^/(..-..)/#$1#
# DEFINE Category_ID=#/womens-clothing/#4567#
/default.css
/widgets.js
/api/product-description.js?product_id=%(PRODUCT_ID)
/%(Language)/images/logo.png
/api/Recommendation.js?category_id=%(Category_ID)
/api/shopping-cart.js?user=%(Cookie:email)
```

In the above example, a set of variables are defined at top with default values specified, followed by a list of resources, some of which take the variables to form a completely specified reference. The variables can be specified with a particular default value or selected based on a regular expression run against the requested URL, which is illustrated by the second 'DEFINE Language' item reading # DEFINE Language=#^/(. . - . .) /#$1#.

Of particular note is the last entry, in which the location/source of where the proxy server can obtain the value of the variable is specified. In that example, the proxy server is instructed to set the variable using a value in the user cookie called 'email'. Note that the proxy server's native program or a configuration file (e.g., metadata) also can be used to control how the population is performed, so the use of an embedded instruction in the manifest is merely one possibility.

Prefetching Based on Populated Manifest

A proxy uses a populated manifest for prefetching. This is possible because the manifest represents a list of resources for use on the page. By prefetching the content from origin, the proxy server can have the content waiting at the proxy server so that if and when the client does request the content, it can quickly be returned to the client, without having to take the time necessary to issue a forward request to an origin and receive a response.

Note that the manifest can include resources that will be requested as a result of client-executable page loading and rendering directives, sometimes referred to as AJAX. AJAX techniques generally include use of executing scripts using JavaScript and XMLHttpRequest that execute in a client's browser or other application to load data in the background and/or without an entire page reload. An example is the use of a jQuery load method. In some cases the load of the data is the result of end-user interaction with a page. In this way, the manifest can include resources that might be requested asynchronously by a client for a given page. Other active page technologies that can be used similarly include XSLT and Flash. The manifest can thus represent a more complete list of page resources (and hence candidates for prefetch by the proxy server) than an examination of the HTML for the page itself would reveal. This is but one advantage offered by the present prefetching approach. The manifest can also be authored to include more than one level of resources than are on the page. These may be resources that are: (a) a few steps ahead of the initial request in terms of site navigation (e.g., resources that might be required by the client one or two user actions (or "clicks") away from the initial request, such as the product listing, the recommendation, the shopping cart, and the like); and/or (b) common further requests (e.g., a particular product that is on sale or a best-seller).

The set of resources in the manifest need not all be prefetched. For example, the proxy server can parse the list and identify and select certain kinds of items (e.g., certain content types) for prefetching. The criteria upon which to select types of content are preferably configurable at the proxy server, using for example a CDN metadata control file system described earlier to set the configuration. For example a metadata control file may define what content types to select for a given situation (based on the content provider, hostname, URL, network congestion, client connection speed, and/or other factors). The proxy server parses these instructions at request time and thus determines what to prefetch off of the manifest. Metadata can thus control what types of content are allowed for prefetching off of the manifest. Typical examples of mime-types that are good candidates for prefetching include static content like Javascript, CSS, and image files (JPG, GIF, PNG). The proxy server configuration can also require that the prefetched resources be located on the same domain or subdomain, as well as that it not be a personalized or dynamic piece of content (e.g., not requiring a user id from a cookie). In this way a subset of defined, recognized, 'safe' resources can be identified in the manifest file, and then prefetched by the proxy server without waiting for the client to issue a request for them.

Note that the configuration settings for what and how to prefetch off the manifest can be specified by a CDN service provider and/or a content provider.

Example Operational Sequence

Figure 4:
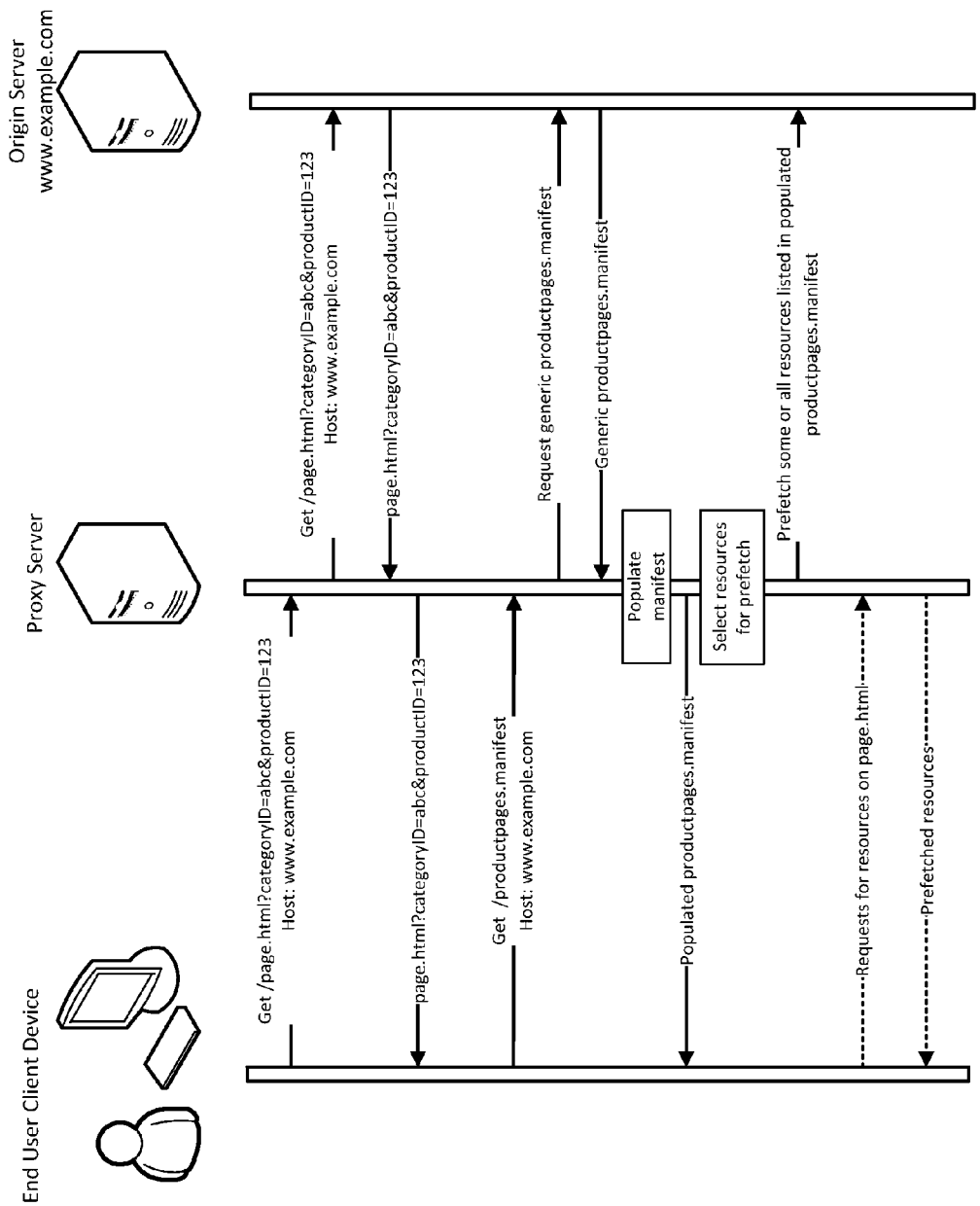
FIG. 4 is a schematic diagram illustrating a sequence of operations amongst a client device, a proxy server, and an origin server, in accordance with an embodiment of the invention.

The following is a non-limiting example of an operational sequence in accordance with the teachings hereof. FIG. 4 illustrates the sequence that is described below.

For purposes of this example, assume that a given content provider's hostname, 'www.example.com', has been aliased to a CDN proxy server using conventional techniques (e.g., via a DNS CNAME, zone delegation or the like) and the client has thus been given the proxy server's IP address as the result of a DNS lookup it initiated to resolve the hostname 'www.example.com.'

1. Client sends an HTTP 'Get' request to get an HTML document for a given page: 'www.example.com/page.html?categoryID=abc&productID=123'
2. Proxy receives client request and checks local cache for the HTML document. Assume there is a cache miss. The proxy issues a forward request to the content provider's origin server, which returns the HTML for 'page.html?categoryID=abc&productID=123'.
    Assume that the HTML references (e.g., via an embedded URL) an HTML5 manifest file 'productpages.manifest'.
3. Proxy sends the HTML document to the client device, while caching it for use in responding to future requests directly from cache.
4. Upon parsing the HTML, the client discovers the reference to the manifest file, and accordingly makes a 'get' request to the proxy for the manifest file 'productpages.manifest'. Assume this manifest is not in cache, and so the proxy requests the manifest from the origin server. The origin returns a generic template manifest file for product pages. The generic manifest file may be generic to all product pages, or to a subset of similar products of which productID=123 is a member, or otherwise.
5. The proxy populates the generic manifest using information from the client request.
    a. For example, assume the generic manifest file specified a resource of: /images/[categoryID]/[productID].jpg
    b. The proxy populates the [categoryID] and [productID] variables based on the particular category id and product id in the client request. Preferably, the values to use for the variables are taken from the client request for the HTML and are carried over to the request for the manifest, e.g., in a URL parameter or in a value read in a session cookie.
        i. For the URL parameter approach, the original page.html document's embedded reference to the manifest mentioned in step 2 above preferably would point to 'productpage.manifest?categoryID=abc& productID=123' so that client would request that reference (the page.html could have come this way from origin or been modified by the proxy to read that way before delivering it to the client in step 2). This allows the original request parameters for the HTML document to carry through to the request for the manifest.
        ii. For the session cookie approach, the proxy server preferably would have stored the appropriate parameters [categoryID] and [productID] in a session cookie on the client in response to the original client request for the page.html file, so that the client would tender this cookie to the proxy server with the subsequent request for the manifest file.

As with the URL parameter approach, this allows the original request URL parameters for the HTML document to carry through to the request for the manifest.

iii. Note that the manifest may call for other variables to be populated from client request header (e.g., HTTP header field values) and/or from data in cookies. The [categoryID] and [productID] are merely used as examples.

6. The proxy serves the populated manifest file to the client in response to the client's request. The manifest can be cached (preferably in generic form) for later use in response to other clients.

7. The proxy parses the listed resources in the manifest to select prefetching candidates, taking note of mime-types that are configured to be acceptable for prefetching and applying other exclusion filters that may be defined by a configuration file applicable to the manifest.

8. The proxy prefetches all or a subset of resources and caches them, thus warming the proxy's content cache for the anticipated requests from the client for these manifest-specified resources that are associated with page.html. The anticipated requests and responses are shown by the arrows with dotted lines in FIG. 4.

Continuing the example, assume that at a later time, the same or another client issues a request for 'page.html?catID=def&productID=456', which also references manifest file productpages.manifest. The proxy can obtain and serve this HTML document, and then in response to the client's request for the productpages.manifest, load the previously-retrieved generic manifest from cache and populate it with the variables [categoryID]=def and [productID]=456 so as to create the appropriate customized list of resources for the given product page. The proxy can use the populated manifest for prefetching, in the same manner previously described. In short, until it expires, the cached generic manifest can be re-used for prefetching in connection with various different product pages, with a relatively high cache hit ratio.

Alternate Embodiment of Operational Sequence

In an alternate embodiment, the proxy server can be configured (e.g., via metadata configuration file) to retrieve the generic manifest automatically (e.g., from a local storage device, or from the origin) upon receiving a request for a given page. In this way, the proxy server can populate the manifest with information from the client request for the page.html without having to wait for the request for the manifest from the client.

Figure 5:
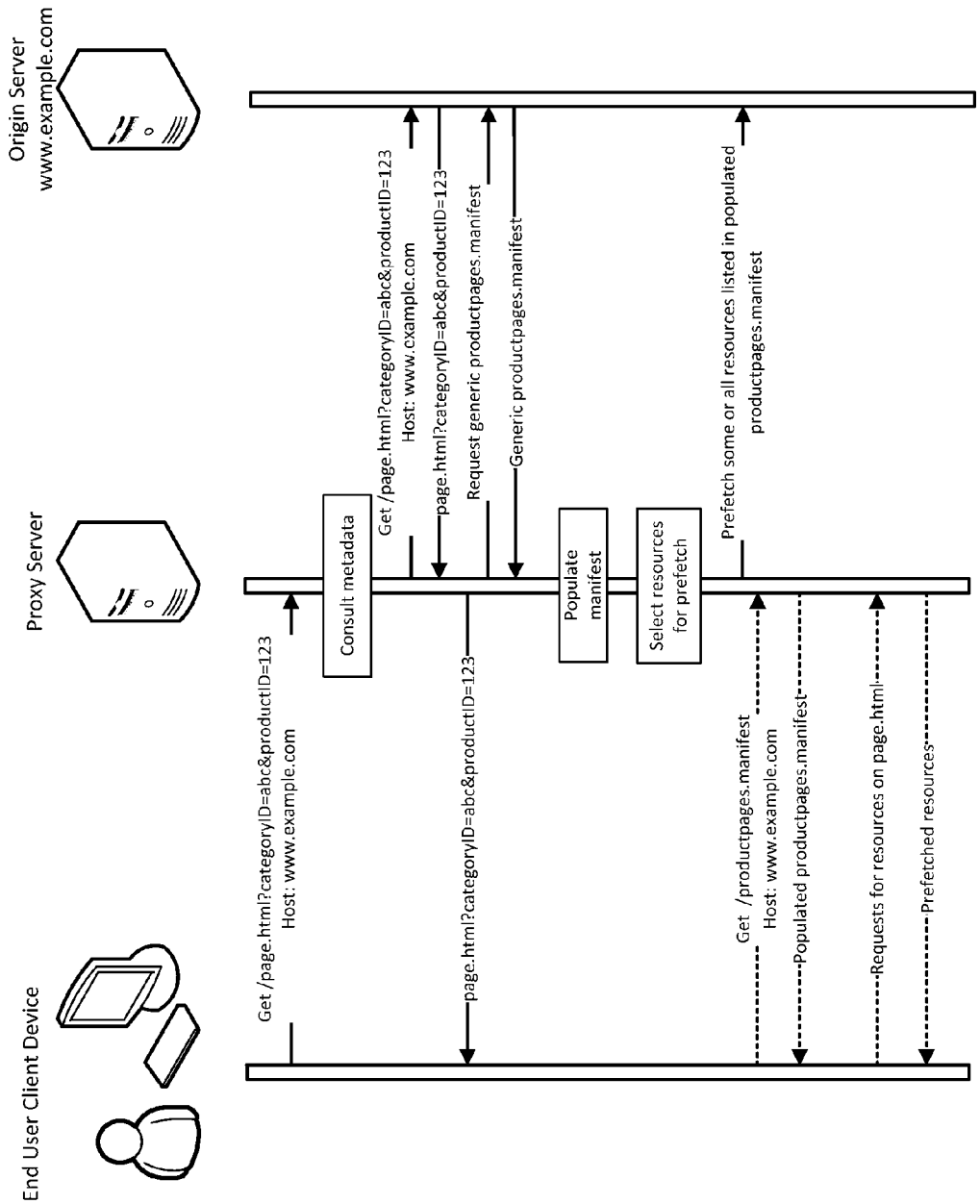
FIG. 5 is a schematic diagram illustrating a sequence of operations amongst a client device, a proxy server, and an origin server, in accordance with an embodiment of the invention.

The following is a non-limiting example of an operational sequence in accordance with this alternate embodiment. FIG. 5 illustrates the sequence that is described below.

1. Client sends an HTTP request for a given page, such as 'www.example.com/page.html?productID=123'

2. Proxy receives client request and checks its metadata configuration file for this hostname, which instructs that the page has a corresponding generic manifest file called 'productpages.manifest'. The configuration file preferably also specifies the location of the generic manifest, e.g., with a URL pointing to a location on the origin server. Proxy retrieves the page.html?categoryID=abc&productID=123 from origin, or local cache if available, and retrieves the corresponding generic manifest file productpages.manifest, again either from origin or local cache, if available. Retrieved HTML and manifests are cached for later use. (Note that in some cases, the manifest could be stored locally and the metadata configuration file information could points to its local location on the proxy machine. However, storing on the origin and fetching with a cache/refresh cycle is preferred.)

3. The proxy returns the HTML for 'page.html?categoryID=abc&productID=123' to the client in response to the client's request.

4. The proxy populates the generic manifest using information from the pending client request (e.g., the URL parameters, HTTP request header field values, session or persistent cookie values, and the like). An advantage of this alternate embodiment is that the proxy does not need to employ the techniques to carry over request parameters from the client's original request for the HTML to the request for the manifest, as were described in the previous embodiment.

5. The proxy parses the list of resources in the manifest for prefetching candidates, taking note of mime-types that are acceptable for prefetching and applying other exclusion filters.

6. The proxy prefetches all or a selected subset of resources and caches them, thus warming the proxy's content cache for the anticipated request from the client for these manifest-specified resources that are associated with page.html. The anticipated requests and responses are shown by the arrows with dotted lines in FIG. 5.

In the above approach, a reference to the manifest file need not be placed in HTML document. If that reference is not included in the HTML document, or the proxy removes it before sending the HTML to the client, the use of the manifest can be hidden from the client. In other words, the proxy can retrieve the manifest, populate it, and use it for prefetching without sending to the client. Note that if the manifest is hidden from the client and used only by the proxy, the manifest file need not be strictly HTML5 compliant—it could be a manifest file used for prefetching in an arbitrary, predefined format understood by the proxy server and the origin server.

As in the prior embodiment, the cached generic manifest can be reused until it expires for prefetching in connection with multiple different product pages.

Alternate Embodiment of Operational Sequence

In yet another embodiment, the proxy server can be configured (e.g., via metadata configuration) to automatically retrieve the generic manifest upon receiving the origin server's response with the HTML for the page, by parsing the HTML received from origin and looking for an embedded manifest. In this way, the proxy server can populate the manifest with information from the client request for the page.html without having to wait for the request for the manifest from the client.

Figure 6:
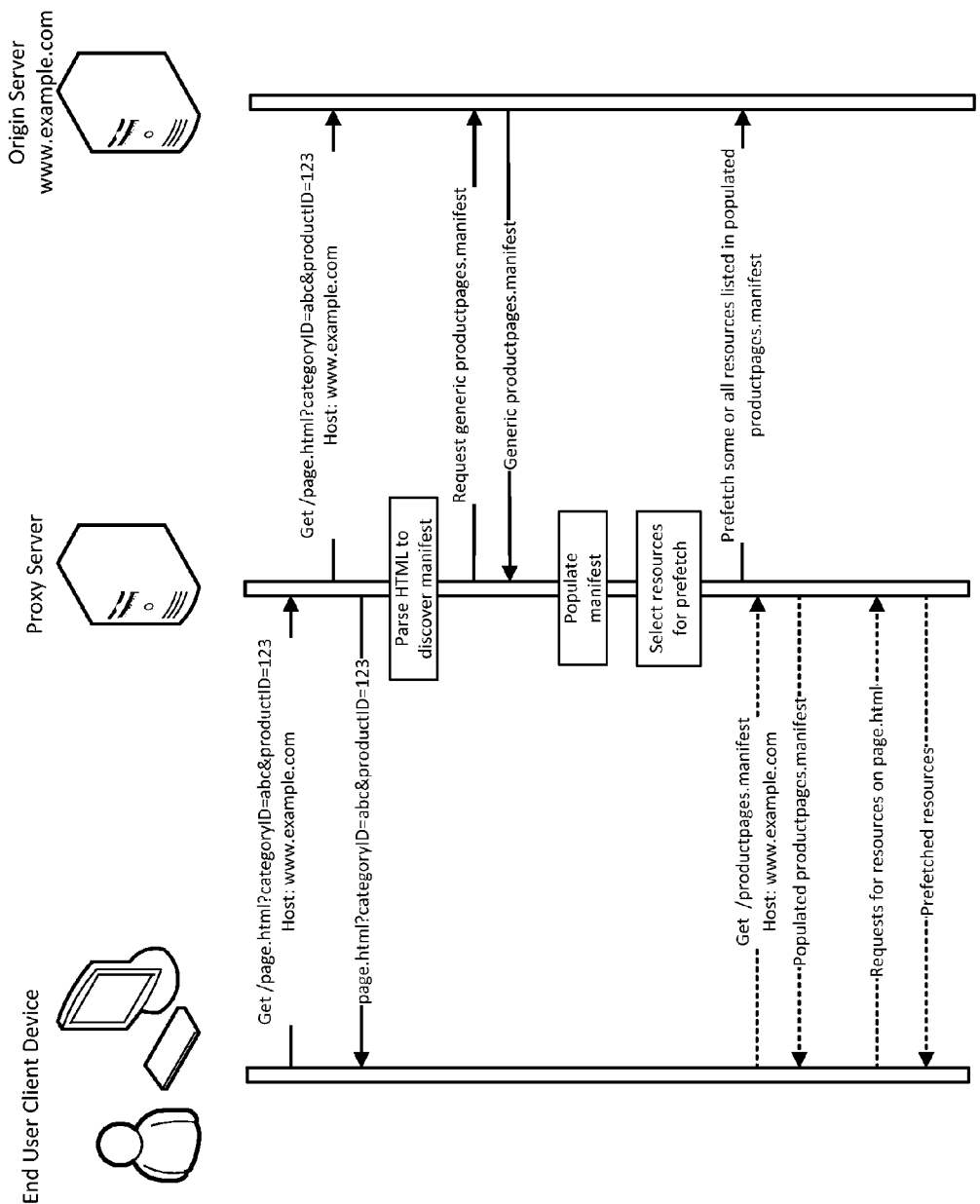
FIG. 6 is a schematic diagram illustrating a sequence of operations amongst a client device, a proxy server, and an origin server, in accordance with an embodiment of the invention.

The following is a non-limiting example of an operational sequence in accordance with this embodiment. FIG. 6 illustrates the sequence that is described below.

1. Client sends a request for a given page, such as 'www.example.com/page.html?productID=123'

2. Proxy receives client request and checks local cache for the HTML document. Assume there is a cache miss. The proxy issues a forward request to the content provider's origin server, which returns the HTML document for 'page.html?categoryID=abc&productID=123'. The proxy returns the HTML for 'page.html?categoryID=abc&productID=123' to the client in response to the client request.

3. The proxy examines the HTML to find that it references an HTML5 manifest file productpages.manifest. The proxy retrieves the manifest from the origin server, without waiting for the client to request it. For example the proxy may request the manifest at the same time as it delivers the HTML to the client. The reference to the manifest file is preferably left in the HTML for the client (particularly if an HTML5 compliant manifest) but alternatively the proxy can remove the manifest file reference before sending the HTML to the client.

4. The proxy populates the generic manifest using information from the pending client request (e.g., the URL parameters, HTTP request header fields, and/or session or persistent cookie values). Again, an advantage of this alternate embodiment is that the proxy does not need to employ the techniques to carry over request parameters from the client's original request for the HTML to the request for the manifest, as described in the first embodiment (FIG. 4).

5. The proxy parses the list of resources manifest to select prefetching candidates, taking note of mime-types that are acceptable for prefetching and applying other exclusion filters as noted previously.

6. The proxy prefetches all or a selected subset of resources and caches them, thus warming the proxy's content cache for the anticipated request from the client for these manifest-specified resources that are associated with page.html. The anticipated requests and responses are shown by the arrows with dotted lines in FIG. 6.

As in the prior embodiments, the cached generic manifest can be reused for prefetching in connection with multiple different product pages. As noted, in some embodiments, the use of the manifest optionally can be hidden from the client by having the proxy remove the reference to the manifest from the page's HTML before serving it to the client.

Note that the exact order of events described above and illustrated in FIGS. 4-6 is meant to be exemplary and illustrative rather than limiting, as those skilled in the art will understand that some events may be rearranged in order, particularly with respect to the priority/timing of executing tasks at the proxy server. (For example, the proxy server might fetch the manifest and page together across a single connection, so both might be returned to the proxy server before it serves the page.html to the client.) These and other variations are meant within the scope and spirit of the present disclosure.

Note also in these embodiments that the proxy server could issue forward requests for the HTML and/or manifest to another intermediary machine, such as another proxy server in a cache hierarchy, rather than an origin.

Automated Generation of Manifest

A manifest may be generated manually or automatically. A variety of approaches can be used to automatically generate a generic manifest for a given web page. For example, the manifest can be generated a) just in time, through analysis of the page's HTML and the resources specified in the HTML; b) using an out-of-band approach that more fulsomely examines the full web page with associated resources and simulates its construction; and/or c) using a heuristical analysis of real-world user logs that indicate client requests for, e.g., an HTML document followed by requests from the client for a set of resources (e.g., within a certain time period).

Each of these approaches is now described in more detail.

A) Just-in-Time Generation

For a given web page request, a proxy server modifies the outgoing HTML for the page to include the location of the manifest in the <html> tag. As the HTML is being delivered and analyzed by the client, the proxy dynamically analyzes the HTML contents to identify all resources (including javascript/css/images and the like) embedded in the HTML. Using the information gathered during the just-in-time analysis, the proxy server constructs and creates the contents of the manifest file that the client browser will soon request. The created manifest file can be used for prefetching by the proxy.

Further, in conjunction with an out of band analysis engine the JIT manifest can be transformed into a generic form for greater cacheability. Using similarity analysis a generic manifest can be used to represent a set of web pages with similar characteristics. For example, the analysis may identify all product detail pages as having similar resource sets that only vary by the query parameter exposed in the URL.

B) Out of Band Analysis in a Simulated Environment

This approach leverages an out of band process that analyzes a web page. An example of such a system is provided in US Patent Publication No. 2011/0314091, titled "Method and System for Automated Analysis and Transformation of Web Pages," the contents of which are hereby incorporated by reference in their entirety.

In general, when a web page is requested, the proxy server can initiate an analysis task to be executed in an out of band machine running appropriate software, referred to herein as an analysis engine. This analysis engine is able to simulate the execution of the page, providing a deep analysis that produces a manifest.

Preferably, the proxy server operates as follows: When a webpage is requested, the proxy server looks for a pre-computed manifest from the offline analysis engine. If the manifest is present, modify the outgoing HTML to include a reference to the manifest file. If the manifest is missing, queue the page for background analysis. The first time that a particular page is seen, it typically has no manifest. To avoid delaying the response, the proxy server can return the HTML without the manifest. For subsequent requests, the manifest will be ready and can be included.

The analysis engine is preferably asynchronous and is responsible for simulating various real world environments and browsers. A browser rendering engine (such as Gecko or the like) runs as a process in the analysis engine server. Each web page that is run through the analysis engine is monitored for resources that are requested by the browser in the simulated environment. This includes executing scripts and firing AJAX that may be on the page. Using the results from the simulated analysis, the analysis engine compiles a full list of resources and generates a manifest file. After the analysis is complete, the manifest is made available for the proxy server to serve and available to be referenced by new page requests. For example, the generated manifest file can be stored in a network storage platform and the location communicated to the proxy server, so that the proxy server can fetch it when needed.

Preferably, after the analysis engine completes a first order analysis and makes the manifest available, the analysis engine conducts a second order analysis over the set of generated manifests. The manifests are stored with the client requests that precipitated them. The second order analysis looks for patterns of generated manifests and identify similar sets of manifests that vary based on request parameters, cookie values, or other characteristics. A set of similar generated manifests would be combined into a generic manifest, with the differences amongst the manifests expressed as variables whose value is based on the requests parameters, cookie values, or other characteristics that were the source of those differences. Alternatively, the differences across a set of similar manifests can be discarded, resulting in a generic manifest with a subset of resources that are common across requests.

Figure 7:
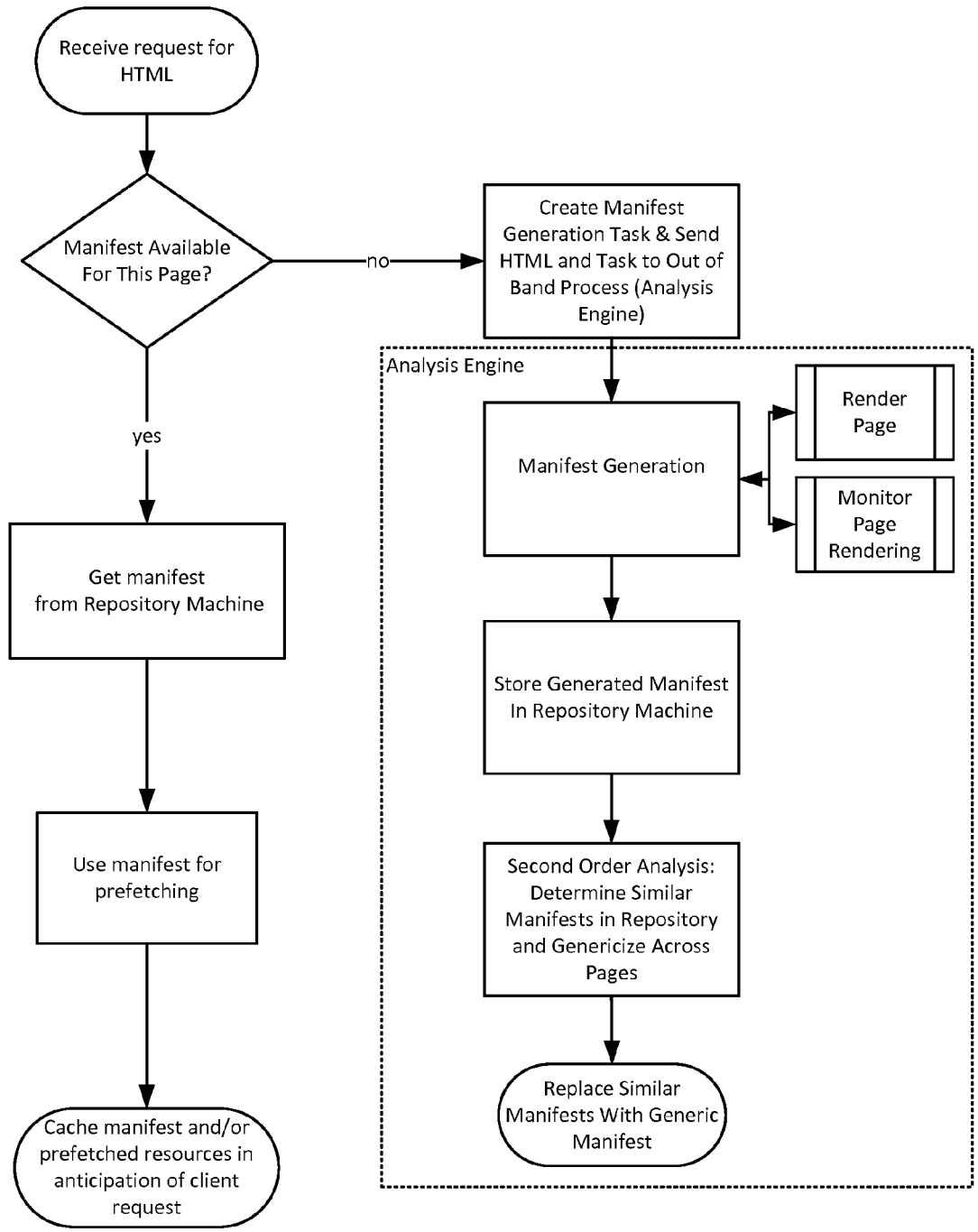
FIG. 7 is a flow diagram illustrating a technique for automatically generating a manifest.

The generic manifest is then made available to the proxy server and identified to the proxy server as the applicable manifest for all pages that were used to develop it. FIG. 7 summarizes, in graphic form, the above processes that occur at the intermediary, and the details of a task generated and sent to the analysis engine.

C) Heuristical Analysis of Log Files

In this approach, an analysis engine parses and evaluates real-world HTTP/S request logs generated by the proxy servers and/or origin servers in response to client interactions. Periodically, client activity would be collected and analyzed in an offline environment with an analysis engine. The analysis engine determines, for each page on a website, the set of resources that were retrieved by clients after requesting the HTML for the page. The set of resources is determined based on finding those requests in request logs that have the same HTTP Referer header (pointing to the same base HTML) and falling within some configurable time period after the request of the base HTML. For example, all resources that were requested with a referrer header of "homepage.html" and within N seconds of the request for homepage.html would be aggregated into a set. These resources can be placed on a manifest that is used for prefetching as described herein. Note that a filter can be applied to exclude certain resources from being placed on the manifest, if desired, based on criteria such as a content type or a predefined blacklist.

Using similarity analysis, a generic manifest can be used to represent a set of web pages with similar characteristics. For example, the analysis may identify all product detail pages as having similar resource sets that only vary by the query parameter exposed in the URL.

Figure 8:
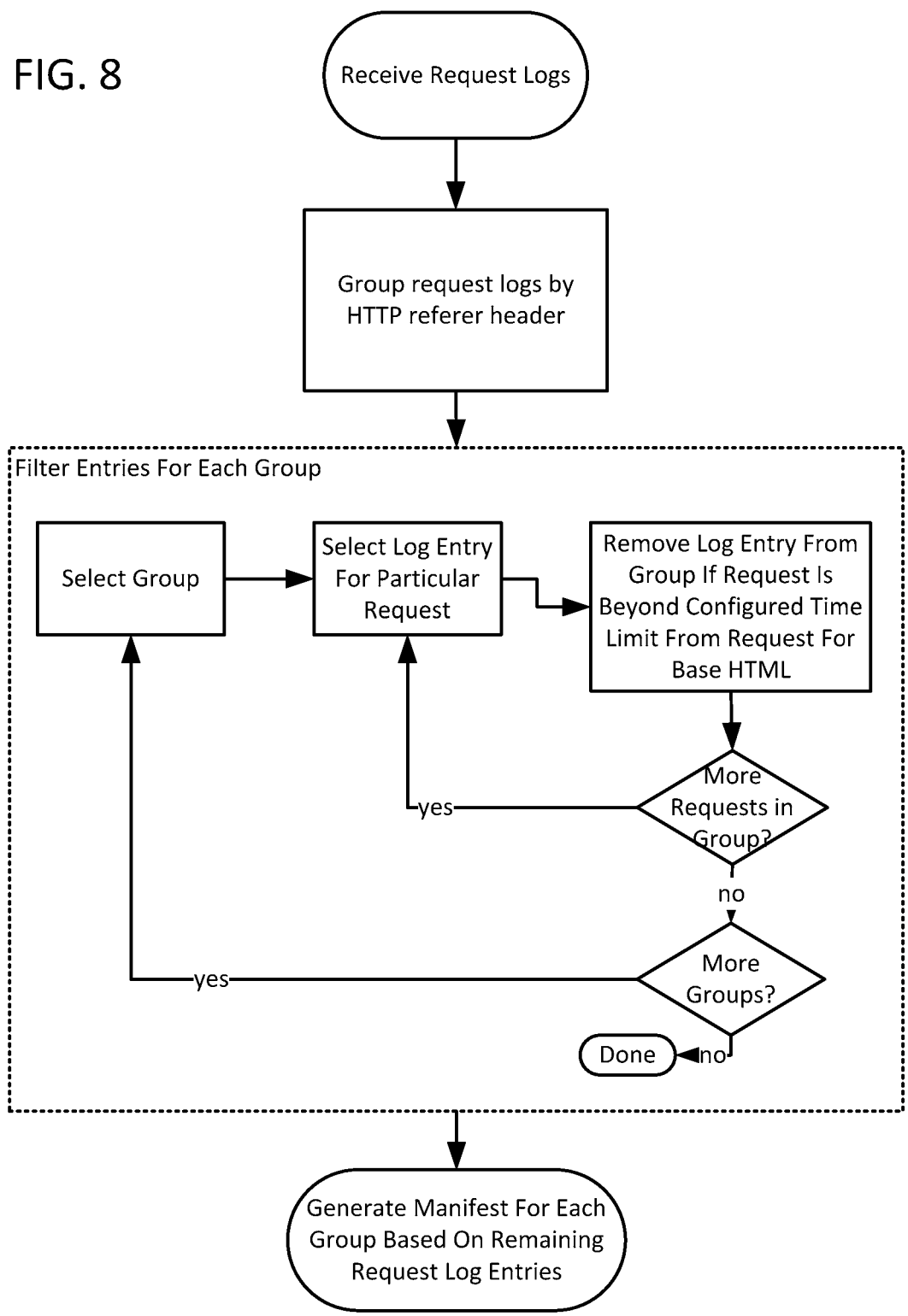
FIG. 8 is a flow diagram illustrating a technique for automatically generating a manifest based on browser groups and/or similarities in HTML pages; and, FIG. 9 is a block diagram illustrating hardware in a computer system that may be used to implement the teachings hereof.

FIG. 8 summarizes, in graphic form, the above processes for analysis of log files.

Adaptation of Manifest for Client

However generated, the manifest can also be used for prefetching by the client. To do this, the proxy can inject the created manifest and/or a reference thereto into outgoing HTML. Based on the manifest, the client the client can easily improve performance by requesting objects ahead of when its native parser engine otherwise would. Each client can potentially have a unique ordering and set for the manifest.

In some cases, the intermediary layer may perform a final adaptation or transformation step on the manifest before using it for prefetching and/or before sending it to a client. This applies regardless of how the manifest is created, whether manually or automated, JIT, through out of band analysis, log analysis, or otherwise.

A variety of customizations can be applied based on the particular requested client. For example, each browser might have a slightly different version of the manifest for prefetching: one manifest may be applicable for Mozilla based clients, whereas another manifest for the same HTML page may apply for Internet Explorer or Chrome. Some resources may be eliminated from the manifest, depending on the requesting client. Also, as noted, the ordering of resources on the manifest may change based on the requesting client. In other words, the capabilities of the client may inform the resources to fetch (e.g.: css first, js secondary).

Further, some clients may not recognize the use of the HTML5 manifest but instead prefer other attributes and directives. For these cases, the generated manifest can be transformed before sending to the client such that the resources to be prefetched are presented and decorated with attributes and declarations that the client can understand. For example, a client may support Resource Hints as proposed by W3C working group. An example of a resource hint is defined <link rel="preload" href=" . . . ">. In this case, the JIT manifest would be translated by the intermediary into resource hints for the client. Generalizing, once a manifest is created, the intermediary layer can transform the manifest into such hints, tags, or other semantics that the client supports.

Alternatives to the Generic Manifest

In some situations, using a substitution-based generic manifest can become too generic and too large for processing in memory. Therefore, alternate variations of the manifest are included in this disclosure.

Alternative variations of the generic manifest include a proxy's use of a processing script that it executes at the time of the user request to construct a list of prefetching resources. The processing script does not require analysis of the requested HTML, but instead provides conditional logic that determines the appropriate prefetch resources based on the request, business logic from the content provider, and characteristics of and/or data from the requesting client (browser type, location, cookies).

More specifically, given a request and business logic that specifies what resources are potential candidates for the request, the script can generate a list of resources. The business logic may specify, for a given requested URL, a particular prefetchable URL. This prefetchable URL however may be incomplete or genericized. The script takes this information and completes the URL with data from the client request. Or, if the URL is not applicable due to some circumstance (e.g., the client does not support the particular prefetchable URL's content-type, the client does not provide the necessary data to complete the URL properly, or otherwise), then the script does not output that URL for the prefetch list. Of course multiple candidate prefetchable URLs may be specified, and the script logic would evaluate each one in turn.

The processing script can utilize syntax similar to Javascript or could be embodied in proprietary machine language. The result is a manifest processing script that is loaded and executed in memory by a proxy. As noted, the execution of the processing script produces a set of URLs for prefetching by the proxy.

Using scripting provides extensibility, including the use of events. For example, a Javascript syntax to generate the list of prefetch resources can include:

```
beginRequest = function (url, request) {
    if (request.cookie["sessionid"] != null)
        return ["/shoppingcart.json?sessionid=" +
    request.cookie["sessionid"]];
}
endResponse = function (url, request, response) {
    if (response.status = 404)
    return ["/404.jpg", "/404.css"];
    }
}
```

In the Javascript example above, two events are illustrated. The first event returns a set of prefetch URLs based on the request. In this case there is a test for the user session cookie. If the cookie exists, then the shoppingcart.json request is returned for prefetching. If the cookie does not exist, this resource is not queued for prefetching. The second event allows even more conditional prefetching based on the response from the origin.

The list of resources generated by the script can be used in the same manner as a populated manifest for prefetching by the proxy and/or sent to the client for prefetching.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 9:
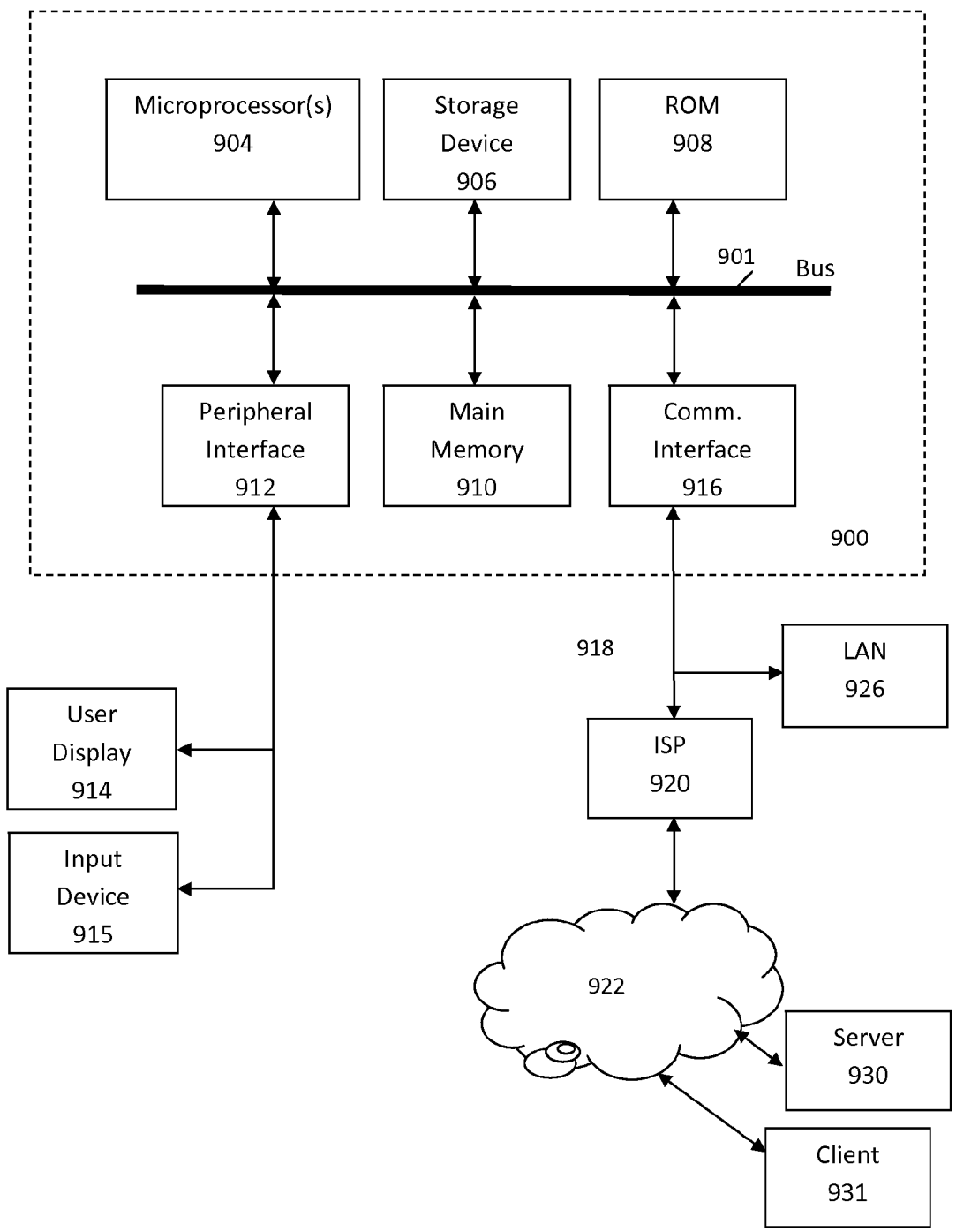

FIG. 9 is a block diagram that illustrates hardware in a computer system 900 on which embodiments of the invention may be implemented. The computer system 900 may be embodied in a client device, server, personal computer, workstation, tablet computer, wireless device, mobile device, network device, router, hub, gateway, or other device.

Computer system 900 includes a microprocessor 904 coupled to bus 901. In some systems, multiple microprocessor and/or microprocessor cores may be employed. Computer system 900 further includes a main memory 910, such as a random access memory (RAM) or other storage device, coupled to the bus 901 for storing information and instructions to be executed by microprocessor 904. A read only memory (ROM) 908 is coupled to the bus 901 for storing information and instructions for microprocessor 904. As another form of memory, a non-volatile storage device 906, such as a magnetic disk, solid state memory (e.g., flash memory), or optical disk, is provided and coupled to bus 901 for storing information and instructions. Other application-specific integrated circuits (ASICs), field programmable gate arrays (FPGAs) or circuitry may be included in the computer system 900 to perform functions described herein.

Although the computer system 900 is often managed remotely via a communication interface 916, for local administration purposes the system 900 may have a peripheral interface 912 communicatively couples computer system 900 to a user display 914 that displays the output of software executing on the computer system, and an input device 915 (e.g., a keyboard, mouse, trackpad, touchscreen) that communicates user input and instructions to the computer system 900. The peripheral interface 912 may include interface circuitry and logic for local buses such as Universal Serial Bus (USB) or other communication links.

Computer system 900 is coupled to a communication interface 916 that provides a link between the system bus 901 and an external communication link. The communication interface 916 provides a network link 918. The communication interface 916 may represent an Ethernet or other network interface card (NIC), a wireless interface, modem, an optical interface, or other kind of input/output interface.

Network link 918 provides data communication through one or more networks to other devices. Such devices include other computer systems that are part of a local area network (LAN) 926. Furthermore, the network link 918 provides a link, via an internet service provider (ISP) 920, to the Internet 922. In turn, the Internet 922 may provide a link to other computing systems such as a remote server 930 and/or a remote client 931. Network link 918 and such networks may transmit data using packet-switched, circuit-switched, or other data-transmission approaches.

In operation, the computer system 900 may implement the functionality described herein as a result of the microprocessor executing program code. Such code may be read from or stored on a non-transitory computer-readable medium, such as memory 910, ROM 908, or storage device 906. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 918 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method implemented by one or more computer apparatus, the computer apparatus comprising one or more servers that have one or more microprocessors and memory holding computer program instructions for execution by the one or more microprocessors to perform the method, the method comprising:
   upon execution of the computer program instructions, the one or more servers performing:
   generating a generic manifest, said generation comprising:
      (a) generating first and second manifests that each include a set of one or more resources identified by URLs, where said generation of the first and second manifests is based at least in part on analysis of any of: page rendering and log files;
      (b) identifying the first and second manifests as similar manifests;
      (c) creating the generic manifest from at least the first and second manifests, said creation comprising inserting in the generic manifest a variable for a URL query parameter, the variable denoting a string to be populated at the time of a client request;
   receiving a first request from a first client device for a first HTML document;
   retrieving the first HTML document from any of: (i) a remote server and (ii) a local cache;
   determining that the first HTML document includes a URL reference to the generic manifest, and using the URL reference to retrieve the generic manifest;
   wherein said retrieval of the generic manifest comprises retrieving the generic manifest from any of: (i) the remote server and (ii) the local cache, the generic manifest specifying a set of one or more resources by one or more URLs;
   sending the first HTML document to the first client device, in response to the first client device's request for the HTML document;
   rewriting one or more strings in at least one of the URLs in the generic manifest based on data in the first client device's request for the first HTML document, to create a first populated manifest;
   after rewriting the one or more strings, sending the first populated manifest to the first client device;
   receiving a second request from a second client device for a second HTML document;
   retrieving the second HTML document from any of: (i) the remote server and (ii) the local cache;
   determining that the second HTML document includes a URL reference to the generic manifest, and using the URL reference to retrieve the generic manifest;
   wherein said retrieval of the generic manifest comprises retrieving the generic manifest from any of: (i) the remote server and (ii) the local cache, the generic manifest specifying a set of one or more resources by URLs;
   sending the second HTML document to the second client device, in response to the second client device's request for the second HTML document;
   rewriting one or more strings in at least one of the URLs in the generic manifest based on data in the second client device's request for the second HTML document, to create a second populated manifest.

2. The method of claim 1, wherein the data in the first client device's request that is used for rewriting the one or more strings comprises any of: a value of a request header field, a universal resource locator (URL) parameter, and a value in a cookie.

3. The method of claim 1, further comprising requesting a particular resource on the first populated manifest from any of: (i) the remote server and (ii) the local cache, said request being prior to receiving a request from the first client device for the particular resource.

4. The method of claim 3, wherein the particular resource is embedded in an HTML document other than the first HTML document that the first client device requested.

5. The method of claim 3, wherein the first HTML document includes a script having instructions executable by the first client device to generate a request for the particular resource.

6. The method of claim 1, wherein the generic manifest further comprises a default value for the variable.

7. The method of claim 1, wherein said generation of the generic manifest further comprises:
   identifying the first and second manifests as similar manifests, said identification comprising comparing the first and second manifests to determine that a first URL on the first manifest and a second URL on the second manifest differ by a query parameter.

8. The method of claim 7, wherein the query parameter's value varies based on any of a parameter and a cookie in requests associated with the first and second manifests.

9. A system, comprising:
   one or more computers communicating over one or more networks, the one or more computers having one or more hardware processors computer memory storing instructions executed by the one or more hardware processors, the instructions comprising:
   program code executable to generate a generic manifest, said generation comprising:
      (a) generate first and second manifests that each include a set of one or more resources identified by URLs, where said generation of the first and second manifests is based at least in part on analysis of any of: page rendering and log files;
      (b) identify the first and second manifests as similar manifests;
      (c) create the generic manifest from at least the first and second manifests, said creation comprising inserting in the generic manifest a variable for a URL query parameter, the variable denoting a string to be populated at the time of a client request;

program code executable to receive a first request from a first client device for a first HTML document;

program code executable to retrieve the first HTML document from any of: (i) a remote server and (ii) a local cache;

program code executable to determine that the first HTML document includes a URL reference to the generic manifest, and using the URL reference to retrieve the generic manifest;

wherein said retrieval of the generic manifest comprises retrieving the generic manifest from any of: (i) the remote server and (ii) a local cache, wherein the generic manifest specifies a set of one or more resources by one or more URLs;

program code executable to send the first HTML document to the first client device, in response to the first client device's request for the first HTML document;

program code executable to rewrite one or more strings in at least one URL in the generic manifest based on data in the first client device's request for the first HTML document, to create a first populated manifest;

program code executable to, after rewriting the one or more strings, send the first populated manifest to the first client device;

program code executable to receive a second request from a second client device for a second HTML document;

program code executable to retrieve the second HTML document from any of: (i) the remote server and (ii) the local cache;

program code executable to determine that the second HTML document includes a URL reference to the generic manifest, and using the URL reference to retrieve the generic manifest;

wherein said retrieval of the generic manifest comprises retrieving the generic manifest from any of: (i) the remote server and (ii) the local cache, the generic manifest specifying a set of one or more resources by URLs;

program code executable to send the second HTML document to the second client device, in response to the second client device's request for the second HTML document;

program code executable to rewrite one or more strings in at least one of the URLs in the generic manifest based on data in the second client device's request for the second HTML document, to create a second populated manifest.

10. The system of claim 9, wherein the data in the first client device's request that is used for rewriting the one or more strings comprises any of: a value of a request header field, a universal resource locator (URL) parameter, and a value in a cookie.

11. The system of claim 9, further comprising program code executable to request a particular resource on the first populated manifest from any of: (i) the remote server and (ii) the local cache, said request being prior to receiving a request from the first client device for the particular resource.

12. The system of claim 11, wherein the particular resource is embedded in an HTML document other than the first HTML document that the first client device requested.

13. The system of claim 11, wherein the first HTML document includes a script having instructions executable by the first client device to generate a request for the particular resource.

14. The system of claim 11, wherein the generic manifest further comprises a default value for the.

15. The system of claim 11, wherein said generation of the generic manifest further comprises:
identifying the first and second manifests as similar manifests, said identification comprising comparing the first and second manifests to determine that a first URL on the first manifest and a second URL on the second manifest differ by a query parameter.

16. The system of claim 15, wherein the query parameter's value varies based on any of a parameter and a cookie in requests associated with the first and second manifests.

* * * * *